US010623480B2

(12) United States Patent
Fuzell-Casey et al.

(10) Patent No.: US 10,623,480 B2
(45) Date of Patent: Apr. 14, 2020

(54) MUSIC CATEGORIZATION USING RHYTHM, TEXTURE AND PITCH

(71) Applicant: APERTURE INVESTMENTS, LLC, Mercer Island, WA (US)

(72) Inventors: Jacquelyn Fuzell-Casey, Mercer Island, WA (US); Skyler Fuzell-Casey, Portland, OR (US); Timothy D. Casey, Mercer Island, WA (US)

(73) Assignee: APERTURE INVESTMENTS, LLC, Mercer Island, WA (US)

( * ) Notice: Subject to any disclaimer, the term of this patent is extended or adjusted under 35 U.S.C. 154(b) by 0 days.

(21) Appl. No.: 16/292,193

(22) Filed: Mar. 4, 2019

(65) Prior Publication Data

US 2019/0199781 A1 Jun. 27, 2019

Related U.S. Application Data

(63) Continuation-in-part of application No. 15/868,902, filed on Jan. 11, 2018, now Pat. No. 10,225,328, which is a continuation-in-part of application No. 14/671,979, filed on Mar. 27, 2015, now Pat. No. 10,242,097, and a continuation-in-part of application
(Continued)

(51) Int. Cl.
*G06T 17/20* (2006.01)
*H04L 29/08* (2006.01)
*G06F 16/78* (2019.01)
*G06F 16/683* (2019.01)

(52) U.S. Cl.
CPC ............ *H04L 67/10* (2013.01); *G06F 16/683* (2019.01); *G06F 16/78* (2019.01)

(58) Field of Classification Search
None
See application file for complete search history.

(56) References Cited

U.S. PATENT DOCUMENTS 5,561,649 A   10/1996  Lee et al.
6,151,571 A   11/2000  Pertrushin
(Continued)

OTHER PUBLICATIONS www.picitup.com; Picitup's; PicColor product; copyright 2007-2010; accessed Feb. 2, 2015; 1 page.
(Continued)

*Primary Examiner* — Delomia L Gilliard
(74) *Attorney, Agent, or Firm* — BakerHostetler

(57) ABSTRACT

A method for categorizing music based on a sample set of RTP scores (rhythm, texture and pitch) for predetermined pieces of music. Some RTP scores correspond to human-determined RTP scores. Each RTP score corresponds to a category among categories. Unless an unknown piece of music was previously RTP scored based on a unique identification, low-level data is extracted from the unknown piece and analyzed to identify RTP scores based on the sample set. The identified RTP scores are then used to categorize each piece of unknown music and playlists may be created based on the categories. Each RTP score corresponds to an intensity level within the corresponding category, which may also be used in creating playlists. The low-level data may be converted to mel-frequency cepstrum coefficient (MFCC) data that is input into a trained neural network to identify the RTP scores.

20 Claims, 9 Drawing Sheets

Related U.S. Application Data

No. 14/671,973, filed on Mar. 27, 2015, now Pat. No. 9,875,304, which is a continuation-in-part of application No. 13/828,656, filed on Mar. 14, 2013, now Pat. No. 9,639,871, and a continuation-in-part of application No. 14/603,324, filed on Jan. 22, 2015, now Pat. No. 10,061,476, which is a continuation-in-part of application No. 13/828,656, filed on Mar. 14, 2013, now Pat. No. 9,639,871, which is a continuation of application No. 14/603,325, filed on Jan. 22, 2015, now abandoned.

(60) Provisional application No. 61/971,490, filed on Mar. 27, 2014, provisional application No. 61/930,442, filed on Jan. 22, 2014, provisional application No. 61/930,444, filed on Jan. 22, 2014.

(56) References Cited

U.S. PATENT DOCUMENTS

| | | |
|---|---|---|
| 6,411,289 B1 | 6/2002 | Zimmerman |
| 6,464,585 B1 | 10/2002 | Miyamoto et al. |
| 6,539,395 B1 | 3/2003 | Gjerdingen et al. |
| 6,657,117 B2 | 12/2003 | Weare et al. |
| 6,748,395 B1 | 6/2004 | Picker et al. |
| 6,964,023 B2 | 11/2005 | Maes et al. |
| 6,993,532 B1 | 1/2006 | Platt et al. |
| 7,022,907 B2 | 4/2006 | Lu et al. |
| 7,024,424 B1 | 4/2006 | Platt et al. |
| 7,080,324 B1 | 7/2006 | Nelson et al. |
| 7,115,808 B2 | 10/2006 | Lu et al. |
| 7,205,471 B2 | 4/2007 | Looney et al. |
| 7,206,775 B2 | 4/2007 | Kaiser et al. |
| 7,227,074 B2 | 6/2007 | Ball |
| 7,233,684 B2 | 6/2007 | Fedorovskaya et al. |
| 7,296,031 B1 | 11/2007 | Platt et al. |
| 7,396,990 B2 | 7/2008 | Lu et al. |
| 7,424,447 B2 | 9/2008 | Fuzell-Casey et al. |
| 7,427,708 B2 | 9/2008 | Ohmura |
| 7,485,796 B2 | 2/2009 | Myeong et al. |
| 7,541,535 B2 | 6/2009 | Ball |
| 7,562,032 B2 | 7/2009 | Abbosh et al. |
| 7,582,823 B2 | 9/2009 | Kim et al. |
| 7,626,111 B2 | 12/2009 | Kim et al. |
| 7,756,874 B2 | 7/2010 | Hoekman et al. |
| 7,765,491 B1 | 7/2010 | Cotterill |
| 7,786,369 B2 | 8/2010 | Eom et al. |
| 7,809,793 B2 | 10/2010 | Kimura et al. |
| 7,822,497 B2 | 10/2010 | Wang |
| 7,858,868 B2 | 12/2010 | Kemp et al. |
| 7,921,067 B2 | 4/2011 | Kemp et al. |
| 8,013,230 B2 | 9/2011 | Eggink |
| 8,229,935 B2 | 7/2012 | Lee et al. |
| 8,248,436 B2 | 8/2012 | Kemp et al. |
| 8,260,778 B2 | 9/2012 | Ghatak |
| 8,269,093 B2 | 9/2012 | Naik et al. |
| 8,346,801 B2 | 1/2013 | Hagg et al. |
| 8,354,579 B2 | 1/2013 | Park et al. |
| 8,390,439 B2 | 3/2013 | Cruz-Hernandez et al. |
| 8,407,224 B2 | 3/2013 | Bach et al. |
| 8,410,347 B2 | 4/2013 | Kim et al. |
| 8,505,056 B2 | 8/2013 | Cannistraro et al. |
| 8,686,270 B2 | 4/2014 | Eggink et al. |
| 8,688,699 B2 | 4/2014 | Eggink et al. |
| 8,855,798 B2 | 10/2014 | Dimaria et al. |
| 8,965,766 B1 | 2/2015 | Weinstein et al. |
| 9,165,255 B1 | 10/2015 | Shetty et al. |
| 9,195,649 B2 | 11/2015 | Neuhasuer et al. |
| 9,788,777 B1 | 10/2017 | Knight et al. |
| 9,830,896 B2 | 11/2017 | Wang et al. |
| 9,842,146 B2 | 12/2017 | Chen et al. |
| 2003/0045953 A1 | 3/2003 | Weare et al. |
| 2003/0133700 A1 | 7/2003 | Uehara et al. |
| 2003/0221541 A1 | 12/2003 | Platt et al. |
| 2005/0065781 A1 | 3/2005 | Tell et al. |
| 2005/0109194 A1 | 5/2005 | Gayama et al. |
| 2005/0109195 A1 | 5/2005 | Haruyama et al. |
| 2005/0211071 A1 | 9/2005 | Lu et al. |
| 2005/0234366 A1 | 10/2005 | Heinz et al. |
| 2005/0241465 A1 | 11/2005 | Goto et al. |
| 2005/0252362 A1* | 11/2005 | McHale ............... G10H 1/368 84/616 |
| 2006/0047649 A1 | 3/2006 | Liang et al. |
| 2006/0096447 A1 | 5/2006 | Weare et al. |
| 2006/0143647 A1 | 6/2006 | Bill et al. |
| 2006/0170945 A1 | 8/2006 | Bill et al. |
| 2007/0079692 A1 | 4/2007 | Glatt et al. |
| 2007/0107584 A1 | 5/2007 | Kim et al. |
| 2007/0113725 A1 | 5/2007 | Oliver et al. |
| 2007/0113726 A1 | 5/2007 | Oliver et al. |
| 2007/0131096 A1 | 6/2007 | Lu et al. |
| 2008/0021851 A1 | 1/2008 | Alcalde et al. |
| 2008/0040362 A1 | 2/2008 | Aucouturier et al. |
| 2008/0184167 A1 | 7/2008 | Berrill et al. |
| 2008/0189754 A1 | 8/2008 | Yoon et al. |
| 2008/0235284 A1 | 9/2008 | Aarts et al. |
| 2008/0253695 A1 | 10/2008 | Sano et al. |
| 2008/0300702 A1 | 12/2008 | Gomez et al. |
| 2008/0314228 A1 | 12/2008 | Dreyfuss et al. |
| 2009/0069914 A1 | 3/2009 | Kemp et al. |
| 2009/0071316 A1 | 3/2009 | Oppenheimer et al. |
| 2009/0182736 A1 | 7/2009 | Ghatak et al. |
| 2009/0234888 A1 | 9/2009 | Holmes et al. |
| 2010/0011388 A1 | 1/2010 | Bull et al. |
| 2010/0042932 A1 | 2/2010 | Lehtiniemi et al. |
| 2010/0053168 A1 | 3/2010 | Kemp et al. |
| 2010/0086204 A1 | 4/2010 | Lessing et al. |
| 2010/0091138 A1 | 4/2010 | Nair et al. |
| 2010/0094441 A1 | 4/2010 | Mochizuki et al. |
| 2010/0223128 A1 | 9/2010 | Dukellis et al. |
| 2010/0223223 A1 | 9/2010 | Sandler et al. |
| 2010/0253764 A1 | 10/2010 | Sim et al. |
| 2010/0260363 A1 | 10/2010 | Glatt et al. |
| 2010/0325135 A1 | 12/2010 | Chen et al. |
| 2011/0112671 A1 | 5/2011 | Weinstein et al. |
| 2011/0184539 A1 | 7/2011 | Agevik et al. |
| 2011/0191674 A1 | 8/2011 | Rawley et al. |
| 2011/0202567 A1 | 8/2011 | Bach et al. |
| 2011/0239137 A1 | 9/2011 | Bill et al. |
| 2011/0242128 A1 | 10/2011 | Kang et al. |
| 2011/0252947 A1 | 10/2011 | Eggink et al. |
| 2011/0252951 A1 | 10/2011 | Leavitt et al. |
| 2011/0271187 A1 | 11/2011 | Sullivan et al. |
| 2011/0289075 A1 | 11/2011 | Nelson et al. |
| 2011/0314039 A1 | 12/2011 | Zheleva et al. |
| 2012/0090446 A1 | 4/2012 | Moreno et al. |
| 2012/0132057 A1 | 5/2012 | Kristensen et al. |
| 2012/0172059 A1 | 7/2012 | Kim et al. |
| 2012/0179693 A1 | 7/2012 | Knight et al. |
| 2012/0179757 A1 | 7/2012 | Jones et al. |
| 2012/0197897 A1 | 8/2012 | Knight et al. |
| 2012/0226706 A1 | 9/2012 | Choi et al. |
| 2012/0260789 A1 | 10/2012 | Ur et al. |
| 2012/0272185 A1 | 10/2012 | Dodson et al. |
| 2012/0296908 A1 | 11/2012 | Bach et al. |
| 2013/0032023 A1 | 2/2013 | Pulley et al. |
| 2013/0086519 A1 | 4/2013 | Fino et al. |
| 2013/0138684 A1 | 5/2013 | Kim et al. |
| 2013/0167029 A1 | 6/2013 | Friesen et al. |
| 2013/0173526 A1 | 7/2013 | Wong et al. |
| 2013/0178962 A1 | 7/2013 | DiMaria et al. |
| 2013/0204878 A1 | 8/2013 | Kim et al. |
| 2013/0205223 A1 | 8/2013 | Gilbert et al. |
| 2013/0247078 A1 | 9/2013 | Nikankin et al. |
| 2014/0052731 A1 | 2/2014 | Dahule et al. |
| 2014/0053710 A1* | 2/2014 | Serletic, II ............... G10H 7/00 84/609 |
| 2014/0053711 A1* | 2/2014 | Serletic, II ............... G10H 1/38 84/611 |
| 2014/0080606 A1 | 3/2014 | Gillet et al. |
| 2014/0085181 A1 | 3/2014 | Roseway et al. |
| 2014/0094156 A1 | 4/2014 | Uusitalo et al. |

(56) References Cited

U.S. PATENT DOCUMENTS

| | | |
|---|---|---|
| 2014/0140536 A1* | 5/2014 | Serletic, II ............ G06F 3/0481 381/98 |
| 2014/0180673 A1 | 6/2014 | Neuhauser et al. |
| 2014/0282237 A1 | 9/2014 | Fuzell-Casey et al. |
| 2014/0310011 A1 | 10/2014 | Biswas et al. |
| 2014/0372080 A1 | 12/2014 | Chu |
| 2015/0078583 A1 | 3/2015 | Ball et al. |
| 2015/0081064 A1 | 3/2015 | Ball et al. |
| 2015/0081065 A1 | 3/2015 | Ball et al. |
| 2015/0081613 A1 | 3/2015 | Ball et al. |
| 2015/0134654 A1 | 5/2015 | Fuzell-Casey |
| 2015/0179156 A1 | 6/2015 | Uemura et al. |
| 2015/0205864 A1 | 7/2015 | Fuzell-Casey et al. |
| 2015/0220633 A1 | 8/2015 | Fuzell-Casey et al. |
| 2016/0110884 A1 | 4/2016 | Fuzell-Casey et al. |
| 2016/0125863 A1 | 5/2016 | Henderson |
| 2016/0203805 A1 | 7/2016 | Strachan |
| 2016/0329043 A1 | 11/2016 | Kim et al. |
| 2016/0372096 A1 | 12/2016 | Lyske |
| 2017/0091983 A1 | 3/2017 | Sebastian et al. |
| 2017/0103740 A1 | 4/2017 | Hwang et al. |
| 2017/0206875 A1 | 7/2017 | Hwang et al. |
| 2017/0330540 A1 | 11/2017 | Quattro et al. |
| 2018/0033416 A1 | 2/2018 | Neuhasuer et al. |
| 2018/0047372 A1 | 2/2018 | Scallie et al. |
| 2018/0049688 A1 | 2/2018 | Knight et al. |
| 2018/0053261 A1 | 2/2018 | Hershey |

OTHER PUBLICATIONS http://labs.tineye.com; Multicolor; Idee Inc.; copyright 2015; accessed Feb. 2, 2015, 1 page.
http://statisticbrain.com/attention-span-statistics/; Statistics Brain; Statistic Brain Research Institute; accessed Feb. 2, 2015; 4 pages.
Dukette et al.; "The Essential 20: Twenty Components of an Excellent Health Care Team"; RoseDog Books; 2009; p. 72-73.
Music Genome Project; http://en.wikipedia.org/wiki/Music.sub.--Genome.sub.--Project; accessed Apr. 15, 2015; 4 pages.
Ke et al.; "Computer Vision for Music Identification"; In Proceedings of Computer Vision and Pattern Recognition; 2005; vol. 1; p. 597-604.
Lalinsky; "How does Chromaprint work?"; https://oxygene.sk/2011/01/how-does-chromaprint-work; Jan. 18, 2011; accessed Apr. 15, 2015; 3 pages.
Gforce; http://www.soundspectrum.com; copyright 2015; accessed Apr. 15, 2015; 2 pages.
Harlan J. Brothers; "Intervallic Scaling in the Bach Cello Suites"; Fractals; vol. 17 Issue 4; Dec. 2009; p. 537-545.
Ke et al.; "Computer Vision for Music Identification"; IEEE Computer Vision and Pattern Recognition CVPR; Jun. 2005; 8 pages.

* cited by examiner

MANIC
5, 4, 3
4, 4, 2
4, 5, 3
4, 4, 3
4, 5, 2

EXCITED
2, 4, 4
3, 4, 3
3, 5, 3
2, 2, 4

HAPPY
3, 4, 4
3, 3, 5
3, 5, 5
3, 3, 4

CAUTIOUS
2, 4, 2
3, 4, 2
3, 3, 2
3, 3, 3
2, 3, 3

PEACEFUL
3, 2, 3
2, 2, 3
3, 2, 2
4, 2, 1
1, 1, 3

SAD
1, 2, 1
2, 3, 1
1, 1, 2
3, 5, 2
2, 2, 2

FIG. 7

MUSIC CATEGORIZATION USING RHYTHM, TEXTURE AND PITCH

CROSS-REFERENCE TO RELATED APPLICATIONS

This application is a continuation-in-part of U.S. patent application Ser. No. 15/868,902, filed Jan. 11, 2018; which is a continuation-in-part of U.S. patent application Ser. No. 14/671,973, filed Mar. 27, 2015, now U.S. Pat. No. 9,875,304, issued Jan. 23, 2018; which is a continuation-in-part of U.S. patent application Ser. No. 14/603,324, filed Jan. 22, 2015, now U.S. Pat. No. 10,061,476, issued Aug. 28, 2018; and is a continuation-in-part of U.S. patent application Ser. No. 14/603,325, filed Jan. 22, 2015; both of which are continuation-in-parts of U.S. patent application Ser. No. 13/828,656, filed Mar. 14, 2013, now U.S. Pat. No. 9,639,871, issued May 2, 2017; the entire contents of each of which are incorporated herein by reference.

U.S. patent application Ser. Nos. 14/603,324 and 14/603,325 both claim benefit under 35 U.S.C. § 119(e) of Provisional U.S. Patent Application No. 61/930,442, filed Jan. 22, 2014, and of Provisional U.S. Patent Application No. 61/930,444, filed Jan. 22, 2014, the entire contents of each of which are incorporated herein by reference.

U.S. patent application Ser. No. 14/671,973 also claims benefit under 35 U.S.C. § 119(e) of Provisional Application No. 61/971,490, filed Mar. 27, 2014, the entire contents of which are incorporated herein by reference.

U.S. patent application Ser. No. 15/868,902 is also a continuation-in-part of U.S. patent application Ser. No. 14/671,979, filed Mar. 27, 2015, the entire contents of which are incorporated herein by reference.

TECHNICAL FIELD

The present disclosure relates to music categorization.

BACKGROUND

A piece of music has a beginning and an end, regardless of its length, its type, whether it is entirely instrumental, vocal or a combination of both, and regardless of whether it is part of a collection of pieces, such as an album, or by itself, a single. Traditional music selections systems, such as APPPLE ITUNES, tend to rely on music types, such as style and genre and other factors, such as, performer(s), decade, etc., to enable users to browse through vast libraries of music and make selections to, listen, rent, buy, etc. For example, in such music selection systems, the music is often organized by the genre, style or type of music, i.e., jazz, classical, hip hop, rock and roll, electronic, etc., and within such genres, the music may be further classified by the artist, author, record label, era (i.e., 50's rock), etc.

Some music selection systems will also make recommendations for music based on user preferences and other factors. Pandora Media, Inc.'s PANDORA radio system, for example, allows users to pick music based on genre and artists, and will then recommend additional pieces the user may be interested in listening to based on the user's own identification system. This identification system is derived from the Music Genome Project. While the details of the Music Genome Project do not appear to be publicly available, certain unverified information about it is available on-line. For example, Wikipedia states that the Music Genome Project uses over 450 different musical attributes, combined into larger groups called focus traits, to make these recommendations. There are alleged to be thousands of focus traits, including rhythm syncopation, key tonality, vocal harmonies, and displayed instrumental proficiency. See, http://en.wikipedia.org/wiki/Music_Genome_Project (accessed Jan. 27, 2019).

According to this Wikipedia article, each piece is represented by a vector (a list of attributes) containing up to 450 or more attributes or "genes," as noted above. Each gene corresponds to a characteristic of the music, for example, gender of lead vocalist, level of distortion on the electric guitar, type of background vocals, etc. Different genres of music will typically have different sets of genes, e.g., 150 genes for some types of music, 350 to 400 genes for other types, and as many as 450 genes for some forms of classical music. Each gene is assigned a number between 0 and 5, in half-integer increments. The assignment of gene values is performed by humans in a process that takes 20 to 30 minutes per piece. Some percentage of the pieces is further analyzed by other humans to ensure conformity. Distance functions are used to develop lists of pieces related to a selected piece based on the vector assigned to the selected piece.

While the Music Genome Project represents an ambitious and detailed identification system, it suffers from many shortcomings as a result of its inherent complexity. The most significant of these deficiencies is that it often recommends pieces, as implemented by PANDORA, as being similar to other pieces, but listeners of those pieces are not capable of identifying why those pieces were determined to be similar. For example, PANDORA allows users to select a "radio" that are based on the music by a particular artist, such as Madonna Radio, which will primarily play Madonna music mixed in with a variety of other artists that PANDORA considers to be similar. Many listeners find, however, regardless of the artist selected for a radio, within a relatively short period of time, such as an hour, the music selection will go off in disparate directions, often ending up with holiday music and other types of music are not remotely related to the selected artist. There may be very good reasons for this, considering the hundreds of attributes being used to make determinations of similarities between the pieces, but those similarities do not appear to relate to what most listeners hear or feel. Accordingly, a better solution is needed.

SUMMARY

A method for categorizing music based on a sample set of RTP scores (rhythm, texture and pitch) for predetermined pieces of music is disclosed. Some RTP scores correspond to human-determined RTP scores. Each RTP score corresponds to a category among categories. Unless an unknown piece of music was previously RTP scored based on a unique identification, low-level data is extracted from the unknown piece and analyzed to identify RTP scores based on the sample set. The identified RTP scores are then used to categorize each piece of unknown music and playlists may be created based on the categories. Each RTP score corresponds to an intensity level within the corresponding category, which may also be used in creating playlists. The low-level data may be converted to mel-frequency cepstrum coefficient (MFCC) data that is input into a trained neural network to identify the RTP scores.

BRIEF DESCRIPTION OF THE DRAWINGS

Throughout the drawings, reference numbers may be re-used to indicate correspondence between referenced elements. The drawings are provided to illustrate examples described herein and are not intended to limit the scope of the disclosure.

FIG. 7 is an illustration of RTP scores for a larger group of pieces objectively scored by RTP and clustered into one of six mood classes by the identification system.

DETAILED DESCRIPTION OF ILLUSTRATIVE EMBODIMENTS

Embodiments of the present disclosure are primarily directed to music categorization. In particular, embodiments involve a music categorization system that objectively categories music based on rhythm, texture and pitch (RTP) values or scores, from which the mood or some other category of the music may be determined.

With respect to mood, when someone listens to a piece of music, the piece tends to evoke some emotion. This may be because of some personal connection a user has to the piece, such as memories or experiences related to the piece, but may also be because of the piece's inherent qualities. Since those inherent qualities may be represented by frequency-related data (i.e., frequencies, structure and organization), that frequency-related data may be used to identify those inherent qualities. The present disclosure describes how spectrograms, whether based on chromagrams or using other forms of spectrograms, may be used to objectively determine the inherent qualities of RTP, which may then be subjectively mapped to moods to identify pieces of music in a new manner.

Figure 1:
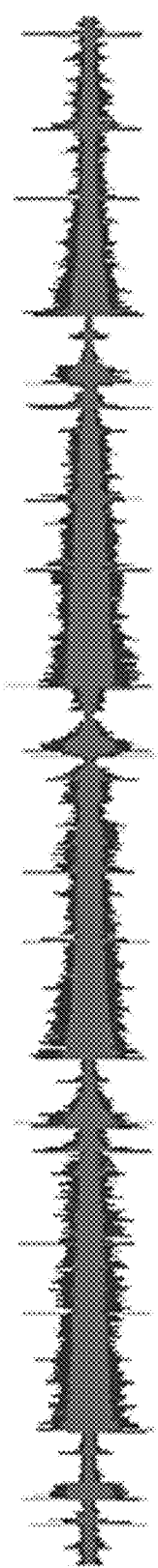
FIG. 1 illustrates an audio file represented as a waveform.

Values for RTP may be determined holistically or based on low level data extracted from the music. An example of a holistic method for determining RTP is as follows. All music can be identified by its frequency-related data. Perhaps the simplest way of doing so is illustrated in FIG. 1, where a piece of music is represented by a one-dimensional (1-D) waveform that illustrates changes in amplitude in the piece over time. While such a waveform can be somewhat distinctive of the piece represented, the amount of information conveyed by the small distortions in the waveform is limited, making it difficult for any person or machine evaluating the waveform to extract much in the way of perceptual information. If that piece evoked a mood in someone listening to the piece, the 1-D waveform does little to represent the characteristics of the piece that evoke that mood.

Figure 2:
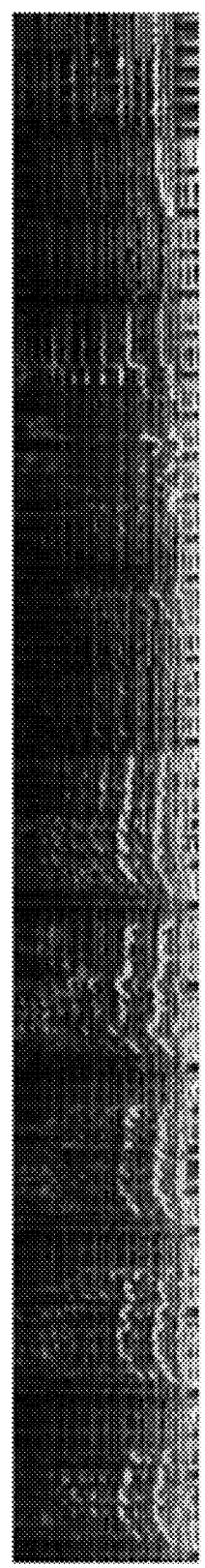
FIG. 2 illustrates an audio file represented as a spectrogram.

Accordingly, audio spectrograms based on a short-term Fourier transform, such as represented in FIG. 2, have been developed to provide a more complete and precise representation of a piece. The spectrogram is a two-dimensional (2-D) representation of frequency over time, like a waveform, but it provides a more accurate representation of the piece because the spectrogram shows changes in intensity at specific frequencies, much like a musical score. The 2-D spectrogram shows more visual distinctions (than the 1-D waveform) based on signal differences due to different audio sources, such as different voices and different types of instruments being played.

While the spectrogram visually represents some similarities and differences in the music, the time-domain signal representation makes the process of comparing spectrograms using correlation slow and inaccurate. One solution proposed for analyzing the characteristics of spectrogram images is disclosed by Y. Ke, D. Hoiem, and R. Sukthankar, *Computer Vision for Music Identification*, In Proceedings of Computer Vision and Pattern Recognition, 2005. In this paper, the authors propose determining these characteristics based on: "(a) differences of power in neighboring frequency bands at a particular time; (b) differences of power across time within a particular frequency band; (c) shifts in dominant frequency over time; (d) peaks of power across frequencies at a particular time; and (e) peaks of power across time within a particular frequency band." Different filters are used to isolate these characteristics from the audio data. If the audio data is formatted in a particular music format, such as MP3, WAV, FLAC, etc., the compressed audio data would first be uncompressed before creating the spectrogram and applying the filters.

An alternative solution for analyzing spectrograms of music in this fashion is the CHROMAPRINT audio fingerprint used by the ACOUSTID database. CHROMAPRINT converts input audio at a sampling rate of 11025 Hz and a frame size of 4096 (0.371 s) with ⅔ overlap. CHROMAPRINT then processes the converted data by transforming the frequencies into musical notes, represented by 12 bins, one for each note, called "chroma features." After some filtering and normalization, an image like that illustrated in FIG. 3 may be generated.

Figure 3:
FIG. 3 illustrates a visual representation of chroma features in an audio file.

While the audio representation, or chromagram, of FIG. 3 is robust and may be used for other purposes herein, it does not lend itself well to comparative analysis with other chromagrams and needs to be further compacted to be useful in that regard, which is where the characteristic filters noted above may come into play. There are a number of ways in which chromagrams may be filtered. For example, first, the image of FIG. 3 may be scanned from left to right, one pixel at a time, in grayscale, to create a large number of subimages. Then, the characteristic filters may be applied to the subimages to capture intensity differences over time in the musical notes represented by the subimages. Each filter may calculate the sum of specific areas of the subimages, compare the sums, and arrange the areas in one of six ways, as illustrated in FIG. 4.

Figure 4:
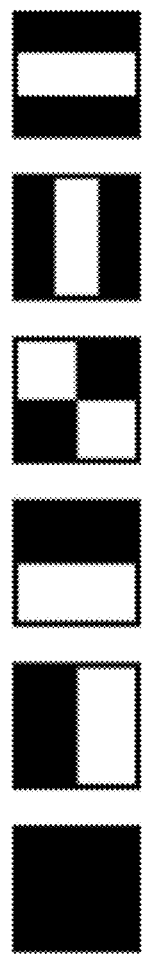
FIG. 4 illustrates subimage filters for filtering the visual representation of FIG. 3 in order to generate an audio fingerprint.
Figure 5:
FIG. 5 illustrates an audio fingerprint.

The arrangement of filter images from FIG. 4 may be placed over the subimages, adjusted in size (as long as the filter images fit within the pixel size of the subimage), and the resulting black and white areas may be processed to derive a single real number representing the arrangement. Every characteristic filter may have one or more coefficients associated with it that specify the rules for quantizing the real number, so the final result is an integer between 0 and 3.

CHROMAPRINT uses 16 filters that can each produce an integer that can be encoded into 2 bits. When these are combined, the result is a 32-bit integer. This same process may be repeated for every subimage generated from the scanned image, resulting in an audio fingerprint, such as that illustrated in FIG. 5. The above discussion of spectrograms, chromagrams, and audio fingerprints as well as the images of FIG. 1, FIG. 2, FIG. 3, FIG. 4, and FIG. 5 are based on https://oxygene.sk/2011/01/how-does-chromaprint-work/.

Once an audio fingerprint has been determined for a piece of music having known RTP scores determined through other means (such as a human listener, a spectrum analyzer, or other electrical measurement tool), that audio fingerprint may be compared to other audio fingerprints having unknown RTP scores to see if a match can be found. If there matches, then any corresponding pieces of music have the same or very similar RTP scores. If they do not match, then further comparisons may need to be run until the unknown RTP scores in the audio fingerprint have been identified. Although this holistic approach might involve a human listening to the music to determine known RTP scores corresponding to a sufficient number of pieces of music for comparative purposes, the approach is still much more efficient than the existing technique of relying on humans to listen to every piece of music.

Figure 6:
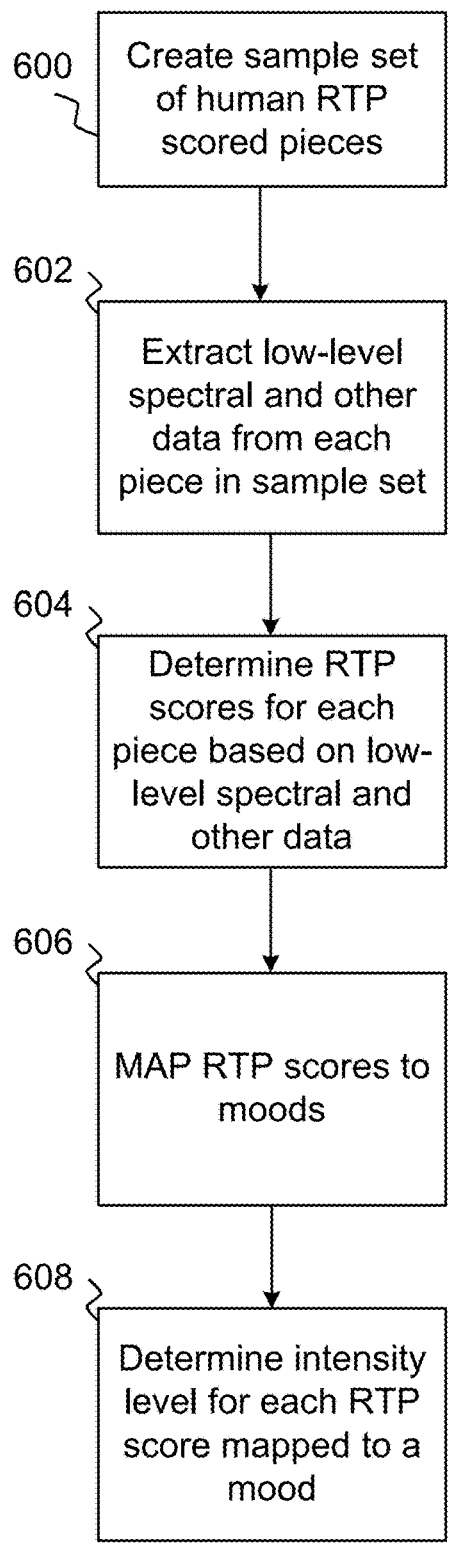
FIG. 6 is a flow chart illustrating how pieces of music are sampled, low-level data is extracted and RTP scores are determined and mapped to moods, possibly with intensity levels.

A different embodiment based on spectrograms, but less holistically, is further described below. In this embodiment, illustrated in FIG. 6, pieces of music sufficient to create a sample set may be listened to by humans to develop RTP scores that correspond to each piece (step 600). Those pieces of music may then be sampled, step 602, by a music data extractor to create spectrograms. Low-level spectral data and other data that describe various acoustic characteristics of the music may then be extracted from the spectrograms. The low-level data may include acoustic descriptors characterizing loudness, dynamic complexity, spectral shapes, barkbands, melbands, Equivalent Rectangular Bandwidth (ERB) bands, etc., rhythm descriptors characterizing beats per minute (BPM), BPM histograms, onset rates, etc., and tonal descriptors characterizing keys, chords, scales, etc. The low-level data may then be analyzed, step 604, to determine high-level data, such as rhythm, texture and pitch. The RTP data may be represented in different forms. In an embodiment, the RTP scores are represented on a half-point scale ranging from 1 to 5.

In an embodiment, a greedy algorithm analyzes all of the low-level data extracted from each piece of music in the sample set to determine which low-level data contributes to correct solutions for RTP scores of each piece of music, based on the known RTP scores. The greedy algorithm may operate by sorting through the low-level data to select the best low-level data candidates for solving for correct RTP scores for each piece. Each best candidate may then be analyzed to determine if the candidate can be used to contribute to the solution. If the candidate can contribute to the solution, a value is assigned to each contributing candidate based on whether it fully or partially solves the solution. If there is no candidate that provides a full solution (as is almost always the case), a collection of contributing candidates is identified that either provides a complete solution or get closest to the complete solution.

In an embodiment, the following low-level data may form a collection of contribution candidates for a solution for rhythm (R):
1. Beats per minute histogram and highest peak, spread of the peak, first peak weight, and first peak beats per minute.
2. Energy (magnitude) in a frequency band.
3. Energy in one or more ERB bands of the spectrum and values of crest (ratio between the maximum value and the arithmetic mean) and flatness (ratio between the geometric mean and the arithmetic mean converted to db scale).
4. Weighted mean of frequencies as a measure of the spectral centroid, where the magnitude of the frequencies are the weights.
5. Skewness of the $0^{th}$, $1^{st}$, $2^{nd}$, $3^{rd}$ and $4^{th}$ central moments.
6. Minimum zero-crossing rate.
7. Mel-frequency cepstrum coefficients (MFCCs).
8. High frequency content.
9. Estimation of silence in a frame.

In an embodiment, the following low-level data may form a collection of contribution candidates for a solution for texture (T):
1. Shannon entropy (quantification of diversity).
2. Beats per minute histogram and mean of first peak spread and second beak beats per minute.
3. Energy in one or more Bark bands of the spectrum and values of crest (ratio between the maximum value and the arithmetic mean) and flatness (ratio between the geometric mean and the arithmetic mean converted to db scale).
4. MFCCs.
5. Spectral kurtosis and energy.
6. Beat energy within the whole spectrum.

In an embodiment, the following low-level data may form a collection of contribution candidates for a solution for pitch (Pt):
1. Weighted mean of frequencies as a measure of the spectral centroid, where the magnitude of the frequencies are the weights.
2. Shannon entropy (quantification of diversity).
3. Beats per minute histogram and first peak weight.
4. High frequency content.
5. Energy in ERB bands of the spectrum and values of flatness.
6. Spectral energy.

Different low-level data extractors may extract different data from the spectrograms than that indicated above. In such as case, the greedy algorithm may identify different low-level data that forms the collection of candidates for a solution to either R, T or P.

In an embodiment, rather than use a greedy algorithm, the extracted low-level data for each piece of music may converted to MFCCs (Mel-frequency cepstral coefficients) as an encoding step and then input into an artificial neural network. The layers of the neural network may extract data from the MFCCs for each piece of music and combine that MFCC data with other data to identify a RTP score for each piece of music, wherein the identification is based on the neural net being trained with known associates between MFCCs and RTP scores. The other data may include audio data augmentation, which may overcome problems associated with data scarcity and otherwise improve recognition performance. Audio data augmentation involves the creation of new synthetic training samples based on small perturbations in a training sample set to fill in gaps in the training data. A sufficiently large set of pieces of music with known RTP scores and other data, such as the audio data augmentation, may lead to a neural network sufficient trained to determine unknown RTP scores for pieces of music with reasonably sufficient accuracy.

As noted above, RTP scores in an embodiment may range from 1 to 5 on a half point scale, i.e., 1.0, 1.5, 2.0, 2.5, 3.0, 3.5, 4.0, 4.5 and 5,0. As such the RTP scores may constitute a spectrum of scores ranging from (1.0,1.0,1.0) to (5.0,5.0, 5.0). These RTP scores may be grouped in various ways. In an embodiment, such as step 606 of FIG. 6, the RTP scores are grouped based on moods, such as happy, excited, manic, cautious, peaceful and sad, where sad may represent RTP scores with lower values and manic may represent RTP scores with higher values. For example, RTP (1.0,1.0,1.0) may correspond to sad and RTP (5.0,5,0,5,0) may correspond to manic.

The moods identified above are just examples and other words representing other moods may be utilized instead, including completely arbitrary words. However, it has been found that the mood conveyed by pieces of music with RTP scores such as (1.0,2.0,1.0) and (1.0,1.0,2.0) and (2,0,2,0, 2.0), are similar and therefor logically map to the same grouping of pieces of music. An example mapping of RTP scores to moods is illustrated in FIG. 7. In this illustration, the spectrum starts at manic, then excited, happy, cautious, peaceful and sad. The RTP to mood mapping illustrated in FIG. 7 is based on a sample set of pieces of music based on westernized music, where most of the music is produced using a certain subset of instruments that exist around the world and based on westernized rhythm patterns. A larger sample set may have a different mapping. A sample set of pieces of music based on music other than westernized music may also have a different RTP to mood mapping as different instruments or different rhythm patterns may be utilized.

Once the RTP scores have been grouped or mapped as desired, the RTP scores within a group may be further refined. For example, when RTP scores are mapped to moods, the RTP scores corresponding to a mood may fall along a spectrum of intensities. For example, RTP (1.0,1.0, 1.0) may be the lowest intensity for sad, while RTP (3.0, 5.0,2.0) may be the highest intensity for sad, with all other RTP scores corresponding to sad falling somewhere in between the lowest and highest RTP scores. Hence, in step 608, the intensity levels for RTP scores within each mood may be determined. Although other spectrums may be utilized, the above example may be used to group pieces of music corresponding to a mood as low, medium and high intensity (or any other suitable gradation) with respect to that mood, as will be further described below.

The description provided above for determining RTP scores for pieces of music may be based on averaging, where various averages are used to determine the RTP scores. For example, the entire piece of music may not be sampled to generate the spectrogram utilized to extract the low-level data. Rather, samples may be collected at different times during a piece of music, such as 10 second samples every 10 seconds, or different length samples at fixed or random points during the piece of music. For a piece of music with a consistent rhythm, texture and pitch throughout the entire piece of music, such as Pachelbel's Canon, written somewhere between 1680 and 1706, and considered the godfather of pop music because so much pop music is based on a similar repetition, this form of averaging may be sufficient to generate a singular RTP score that corresponds to the piece.

Other pieces of music may vary significantly throughout, such as starting softly and building up over time until there is a thunderous ending. Other pieces of music are literally all over the place and may have many different moods each with different intensity levels throughout. Bohemian Rhapsody by Queen, for example, is six minutes long and includes several sections, including an introduction, a ballad segment, an operatic passage, a hard rock part, and a reflective coda. For a piece of music like Bohemian Rhapsody, samples taken during the introduction, the ballad segment, the operatic passage, the hard rock part and the coda may result in completely different RTP scores. In an embodiment, samples may be taken during the entire piece or for sufficient lengths of time along a large enough set of points during each piece, such that different RTP scores may be determined for different parts of the same piece of music. For example, a piece may be 40% manic, 40% sad, and 20% happy, and may have different intensity levels within each of those corresponding moods. In order to simplify the current disclosure, only a single RTP score is determined for each piece of music, but it should be understood that multiple RTP scores may be determined for each piece of music.

Figure 8:
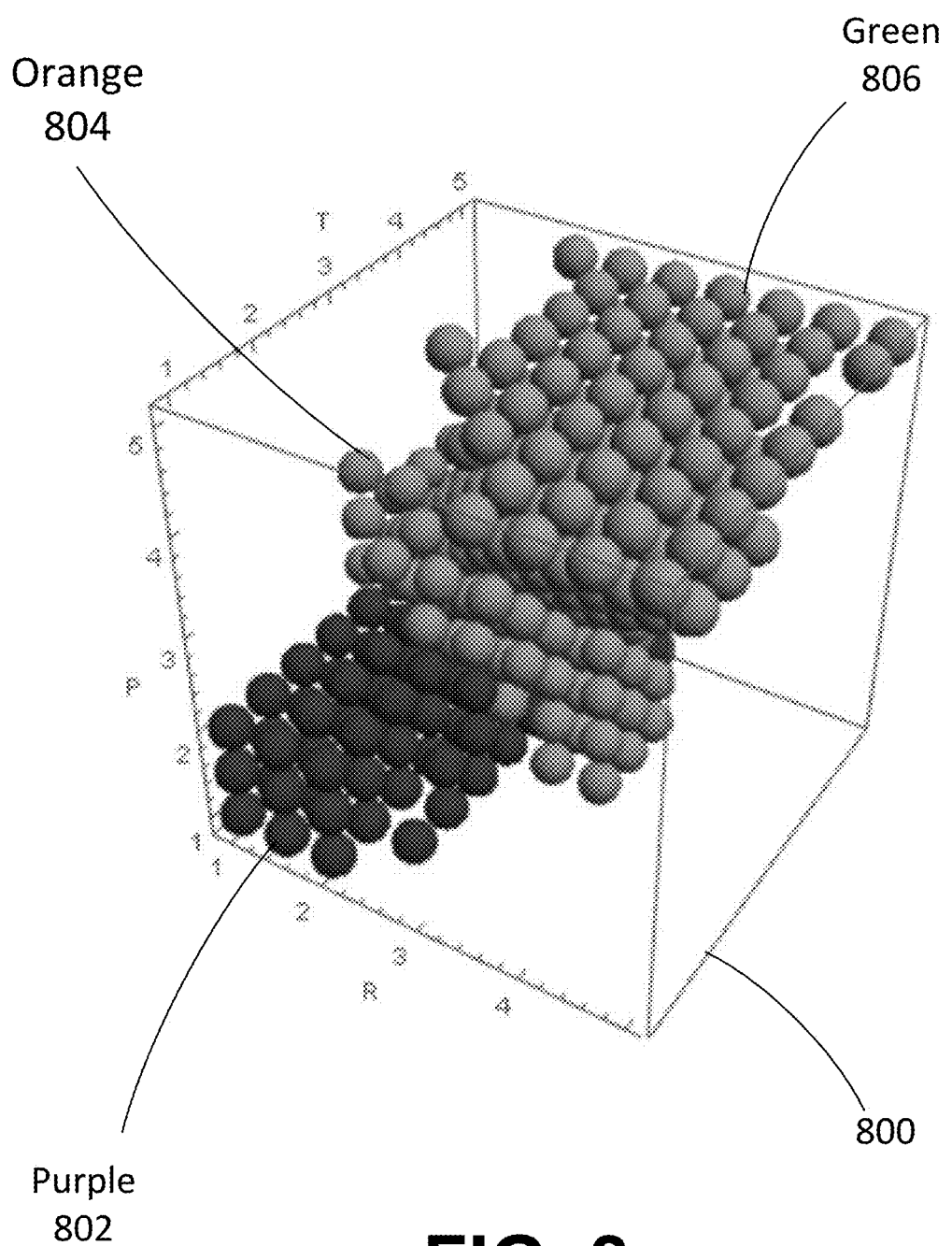
FIG. 8 is an illustration of three-dimensional shapes based on RTP identifying different mood clusters.

RTP scores may also be used to visualize moods to users through both color and shape. In the parent U.S. patent application Ser. No. 15/868,902, embodiments for utilizing color and shape to represent moods were discussed as a further way to verify the mood of a piece of music. The use of RTP scores are accurate enough, however, that validating embodiments may not be required. Nevertheless, shape and color may still be utilized in other ways as further illustrated in FIG. 8, which shows three different collections of RTP scores corresponding to different moods. The three-dimensional cube 800 illustrates these moods in accordance with their RTP scores, where R is the bottom face of the cube 800, T is the top face of the cube 800 and P is a side face of the cube 800. Each sphere within the three-dimensional cube 800 corresponds to an RTP score. For example, the RTP score (1.0,1.0,1.0) is represented by a sphere within the group of purple spheres 802, corresponding to the sad mood, the RTP score (3.0,3.0,3.0) is represented by a sphere within the group of orange spheres 804, corresponding to the cautious mood, and the RTP score (5.0,5.0,5.0) is represented by a sphere within the group of green spheres 806, corresponding to the manic mood. The spheres representing the other moods happy, excited and peaceful can be seen in FIG. 11, thereby completely filling the three-dimensional cube 800. As can be seen in FIG. 8, the spheres within each mood may have a color and form a shape representing that mood. The shape and color of each mood may also allow users to visualize the relationship between the moods and their corresponding RTP scores.

Figure 9:
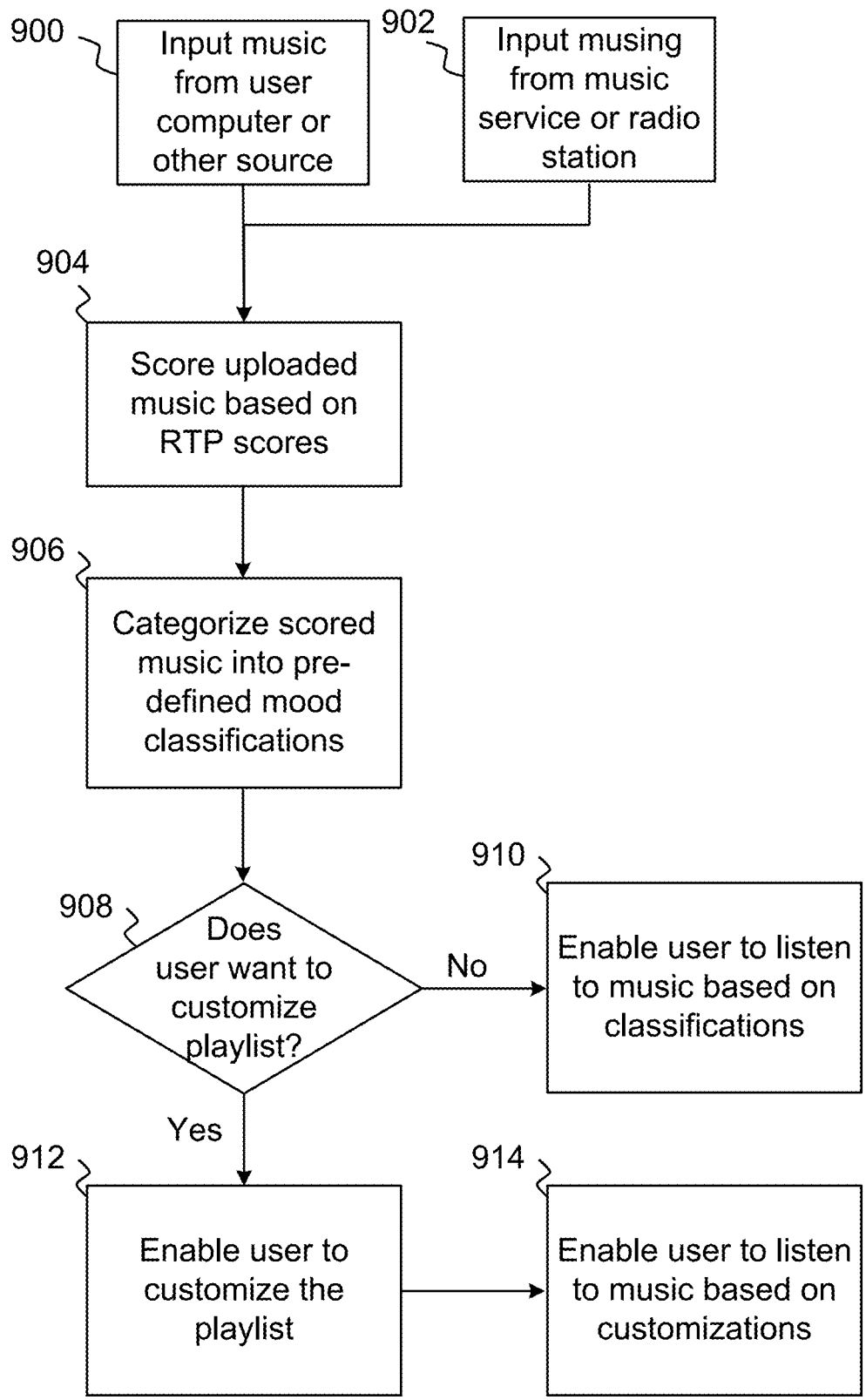
FIG. 9 is a flow chart illustrating the objective scoring of input pieces based on RTP scores, the objective classifying of the scores to cluster the pieces into different categories, various options that may be performed by a user to customize playlists based on the mood classes, and the subsequent utilization of the pieces by the users in accordance with this process.

In an embodiment, as illustrated in FIG. 9, pieces of music to be RTP rated and mood mapped for a playlist may be input by a user in a variety of ways. For example, pieces of music may be input from a user computer or some other source, such as a recording artist or recording company, 900, or a music service, such as ITUNES, SPOTIFY, PANDORA and the like, or a radio station 904 with a collection of music. Inputting the music may include sending files corresponding to the music in different formats, such as MPEG, FLAC, WAVE, etc., to a central server that determines the RTP scores. In the event copyright or bandwidth restrictions are an issue, the low-level data may be extracted from the pieces of music at a client level, such that only low-level data (which is not a copy of the piece of music) may be transported to the central server. Of course, a central server need not be required, as all analysis may be done at a client application, but centralizing the analysis function may reduce the need to constantly push out updated versions of the client application.

Once the pieces of music have been input in some manner, the pieces may be analyzed to determine the RTP scores, step 904, for the pieces. Once the pieces have been scored, the pieces may be mapped into different mood classifications as noted above, step 906, and as appropriate for the RTP score of the pieces. Once the moods of pieces have been determined, users may organize the RTP scored music in any manner they choose. If a user has input the music from their own computer, they can create playlists on their computer based, at least, on the moods of the music. If the music has been input from a music service, the user application of the music service may allow the user to create playlists based on moods and other factors. Likewise, a radio station with a collection of music may allow users to create playlists based on that collection and the moods assigned to the pieces and then listen to the playlist through a user application associate with the radio station.

In an embodiment, users may be able to create a playlist that includes piece of music assigned to different moods and to customize that playlist further based on various factors, step 908. If the user does not wish to customize the playlist, the user may listen to the music based on just the mood classifications, 910. If the user wants to customize the playlist, 912, once the playlist has been customized, the user can listen to the custom playlist, 914.

Figure 10:
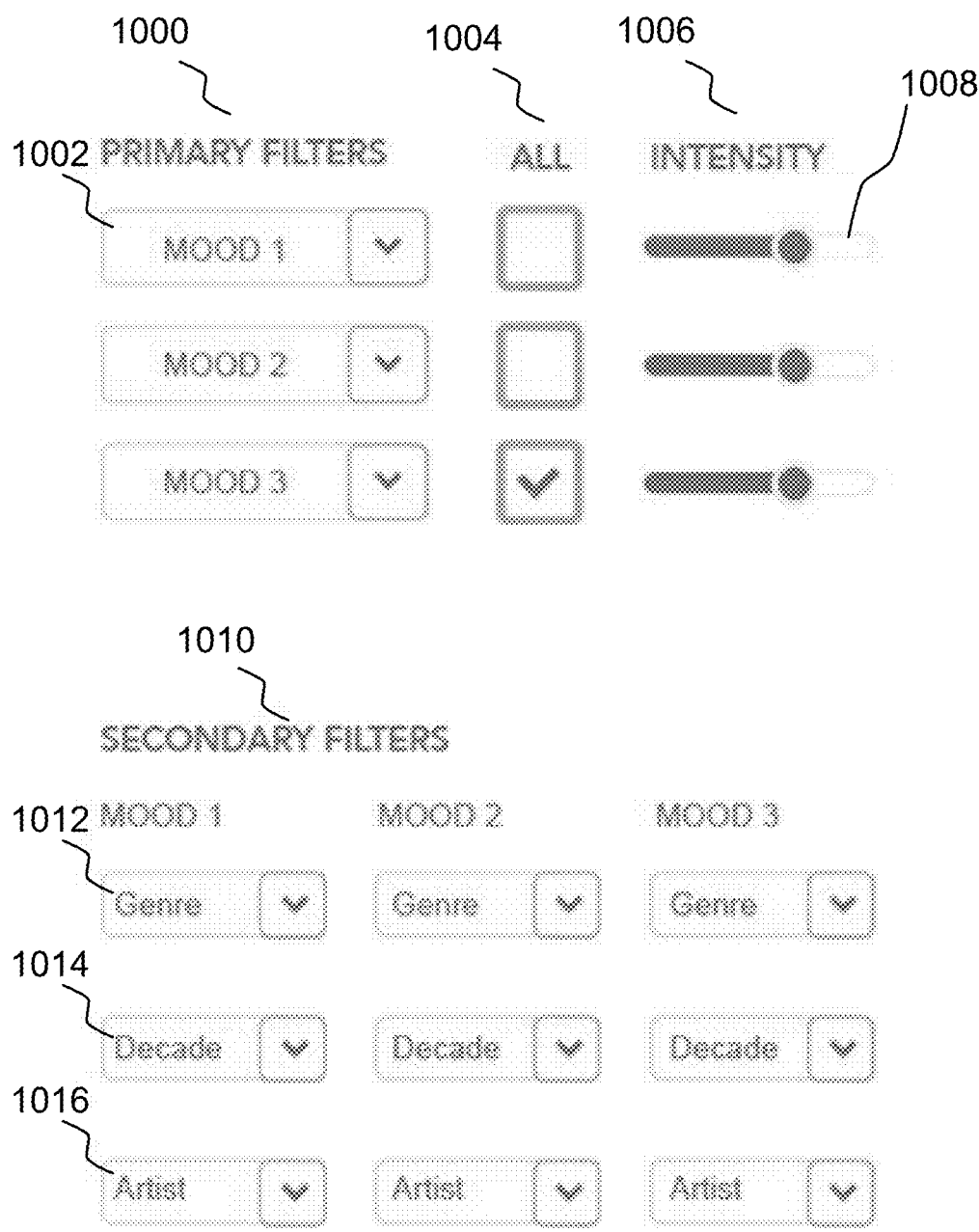
FIG. 10 is an illustration of a user interface with primary filters for filtering the moods in a playlist based on intensity and secondary filters for filtering the playlist based on genre, decade and artist.

An embodiment for customizing a playlist is illustrated in FIG. 10. A primarily playlist filter 1000 may be used to select among different moods 1002 corresponding to pieces of music to be included in a custom playlist. In an embodiment, the user may select a single mood, or multiple moods. In an embodiment, the mood selections may be for any pieces of music that include even part of that mood, such as a piece of music that is 20% of a certain mood. For each selected mood, the user may select to include all pieces of music 1004 within that mood, or select pieces based on intensity 1006. If a user desires to filter pieces of music in a playlist based on intensity, the user may select the handle of the slider 1008 and move the slider to a desired intensity level.

While the intensity levels may cover a range, such as 1.0-5.0, with 1.0 being low, 3.0 being medium and 5.0 being high, as further described in the parent applications incorporated by reference herein, the ranges on the slider may correspond to spans within that range so that a user's choice within a range is not too limited. If a user's choice is truly limited to only RTP scored pieces of music with a high intensity level, the user may find that too few songs are selected for their liking. For this reason, once the user identifies an intensity level, the corresponding span is purposed designed to be a bit bigger, so more pieces of music will be included. For example, if a user selected an intensity level of 4.0, the span may cover a broader portion of the intensity range, such as 3.5-4.5 or 3.0-5.0, thereby allowing a larger number of pieces to be included with the selection, while still more or less honoring the user's intensity selection.

Once the primarily filters 1000 have been selected, secondary filters 1010, if desired, may be used to further customize a playlist. For each mood selected in the primary filters 1000, the user may then choose to only include or only exclude pieces of music with certain characteristics, such as genre 1012, decade 1014 and artist 1016. These characteristics are only exemplary and other characteristics, typically based on metadata associated with each piece of music may also be included. If a user selected genre 1012 for a first mood, the user may be able to further filter the playlist to include pieces of music that are of a certain genre, or exclude such pieces, such as include jazz, but exclude country. Likewise, a user could further filter by decade 1014, so as to exclude 1980's music but include 2000's music. Artists 1016 could also be included or excluded. Once the filtering has been completed, the user may then listen to the customize playlist 914.

As the RTP to mood mapping involves some objective determination, i.e., identifying which RTP scores map to which mood and/or the name of the mood or category, some users may feel that certain pieces of music are assigned to the wrong mood and/or the mood is incorrectly identified. For this reason, users may be given the ability to change the moods assigned to certain RTP scores or group pieces into their own categories and to name those categories as they choose. If a user does not want to customize any aspect of a mood for a piece, then the user may be able to just listen to the pieces as classified, step 910. Alternatively, if the user wants to customize the moods or categorize the pieces based on moods, they may do so, step 912. In an embodiment, the user may want to categorize pieces with the same mood or perhaps different moods within a single category that they name themselves, such as "Sunday Listening," which includes a grouping of pieces with different moods that a user likes to listen to on Sundays, step 914. Users may also be able to change the names of the moods from Manic, Excited, Happy, Cautious, Peaceful and Sad to whatever words they want. Hence, RTP to mood mapping may be more about RTP to category mapping, with the user having the ability to identify what the category is to be called.

Figure 11:
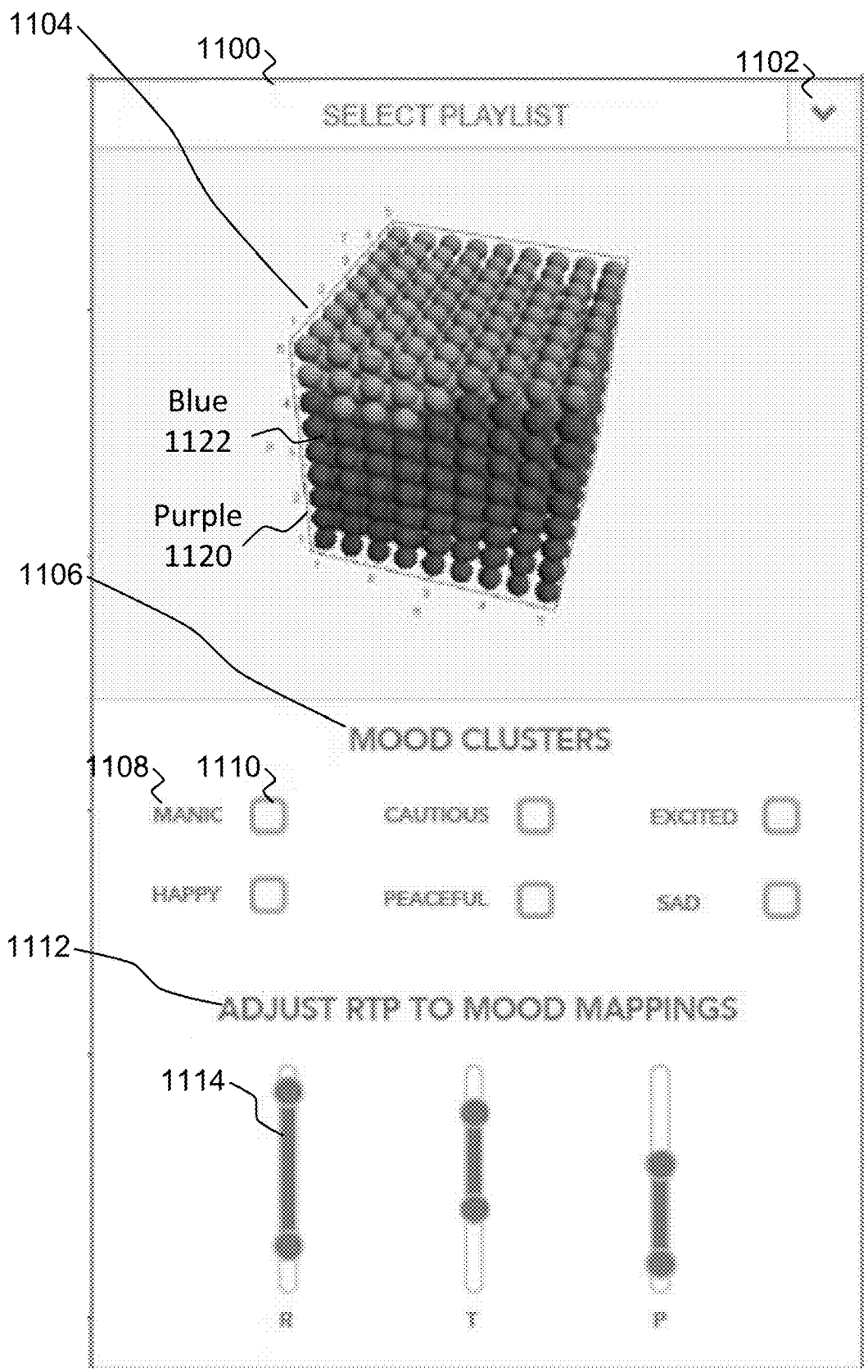
FIG. 11 is an illustration of a user interface for customizing playlists to include different RTP score to mood or category mappings.

In an embodiment, the customization of step 912 may be performed as illustrated in FIG. 11. A user may select a playlist 1100 to be customized by selecting the dropdown selection button 1102 and picking a playlist 1100 from a list (not shown) of available playlists that would become visible. Once the playlist 1100 has been selected, the three-dimensional cube 1104 may be illustrated. The cube 1104 illustrates all 729 (i.e., $3^3$) RTP scores as different colored or shaded spheres. Unless the RTP scores to mood mappings for the cube 1104 have already been customized, the arrangement of the spheres may be based on a default mood mapping.

To customize the RTP to mood mappings, the user may select or deselect one of the different mood clusters 1106 illustrated in the cube 1104. In an embodiment, the cube 1104 may be designed to not show any mood clusters 1106 until the user selects a mood 1108 by checking one of the boxes 1110 corresponding to a mood. Once a box 1110 was selected, the mood cluster of spheres corresponding to that mood might be shown in the cube 1104. In another embodiment, as shown in FIG. 11, all of the mood clusters 1106 may be shown by default. A user may then select the boxes 1110 for mood clusters that the user does not want shown. For example, by selecting the boxes 1110 for manic, happy, cautious, peaceful and excited, only the mood cluster 1106 for sad may be shown, which corresponds to the mood cluster 1106 of spheres shown in the bottom left corner of the cube 1104.

Once a single mood has been selected for customization, the user may adjust the RTP to mood mappings 1112 through use of the sliders 1114. Each of the sliders 1114 corresponds to R, T and P, with two handles, illustrated by the darkened circles and a darkened area between the handles representing the range of R, T or P scores for the corresponding mood cluster 1106 illustrated in the cube 1104. As shown in FIG. 11, since all of the mood clusters 1106 are shown in the cube 1104, the handles of the sliders should be at 1 and 5 and the entire slider should be darkened as all RTP scores are currently represented. However, for purposes of illustration only, the sliders 1114 show how the sliders might look if only a single mood cluster 1106 was selected and that mood cluster corresponded to R scores ranging from 2 to 4.5, T scores ranging from 2.5 to 4 and P scores ranging from 1.5 to 3.

To customize the RTP to mood mappings for that mood cluster, the user may then select one of the handles on the sliders 1114 and move it up or down. In an embodiment, by selecting the upper handle on the R slider 1114, the user may move the handle up to 5 such that R now covered the range of 2 to 5. As the sliders 1114 are manipulated for one mood cluster 1106, the spheres corresponding to that mood cluster and any other mood cluster with an impacted RTP score may likewise change. For example, as illustrated in FIG. 11, the RTP score spheres for the purple mood cluster 1120 may represent a P range of 1 to 2 and the RTP score spheres from the blue mood cluster 1122 may represent a P range of 2.5 to 4. Of course, each of the mood clusters 1120 and 1122 may have P ranges different from these based on RTP score spheres that are not visible in cube 1104, so this is just a simplified explanation. Given this simplified explanation, if the slider 1114 from the purple mood cluster 1120 was moved from 1-2 to 1-2.5, one of the RTP score spheres in the blue mood cluster 1120 would become part of purple mood cluster 1120 instead. As there must always be 729 RTP score spheres, any change adding or subtracting a RTP score sphere from one mood cluster must add or subtract that RTP score sphere from another mood cluster.

Once a user has customized the mood clusters for a particular playlist, the use may be able to save the playlist with the customizations. A save function is not illustrated, but would be known to one of ordinary skill in the art. In a similar manner, all of the playlists may be modified one by one, or a user may be able to customize all playlists at one time. If a user was unhappy with customization that the user had made to any playlist, the user could make further changes in that manner described above, or return to the default settings by selected a return to default settings button (not shown).

Figure 12:
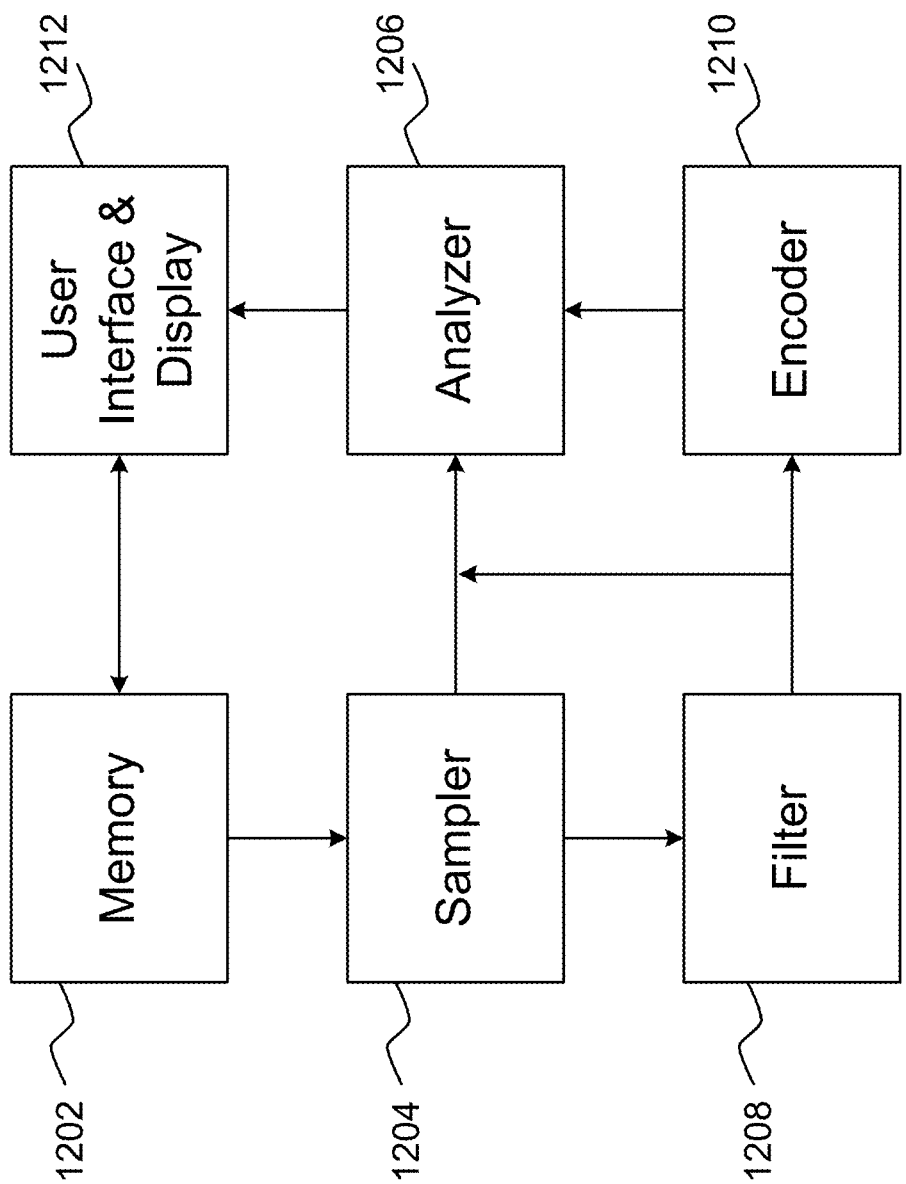
FIG. 12 is a block diagram illustrating a computing system for implementing the techniques described herein.

A block diagram of a music categorization system based on the above disclosure is illustrated in FIG. 12. A memory 1202 stores a plurality of content. The data, such as frequency data, in that content may then be read and/or sampled by the sampler 1204 on a periodic basis to extract low-level spectral or other data from each piece until all of the content in the memory 1202 has been sampled, which may then be updated from time to time with new content sampled by the sampler 1204 as the new content is added. After the content is read and/or sampled, the analyzer 1206 may generate high-level representations of the pieces, such as RTP scores.

In an embodiment, the analyzer 1206 may be utilized to generate static representation of the piece based on the low-level sampled frequency data, which may be a static visual representation, such as a spectrogram or mel spectrogram. The static visual representation may then be filtered by the filter 1208 to capture intensity differences or other differences represented in the static visual representation and to generate a filtered representation of the content. An encoder 1210 may then encode the filtered representation and create digitized representations of the content based on the encoded filtered representation, such as an audio fingerprint. Alternatively, the analyzer 1206 may utilize the spectrograms in a neural network to determine RTP scores as described herein. The analyzer 1206 may operate in conjunction with the user interface and display 1212 to generate imagery for display to a user over a display and to receive commands and input from the user.

In an embodiment, before a piece of music is processed to extract the low level data and perform other processing, a music identification code may be obtained from the metadata file associated with the music, such as the international standard recording code (ISRC), a Shazam code, or MusicBrainz Identifier (MBID). Each music identification code unique identifies the piece of music and may also be used to identify other information about a piece of music, such as an artist name, releases, recordings, etc. In an embodiment, a database is maintained of RTP scores determined for known music identification codes. A lookup may first be performed, prior to extracting data from a piece of music to determine in an RTP score already exists for the piece of music, in which case the RTP score may be provided without performing any further analysis.

In an embodiment, a method for categorizing music comprises creating a sample set that includes a RTP score for a plurality of possible combinations of a rhythm score (R), a texture score (T), and a pitch score (P) respectively from a R range, a T range, and a P range, at least some of which RTP scores each correspond to a human-determined RTP score for a predetermined piece of music among a plurality of predetermined pieces of music, each RTP score corresponding to a category among a plurality of categories; extracting low-level data from each piece of music among a plurality of pieces of music to be RTP scored; analyzing the low-level data to determine computer-derived RTP scores for each piece of music among the plurality of pieces based on the sample set, each computer-derived RTP score corresponding to one RTP score in the sample set; utilizing the computer-derived RTP scores for each piece of music to determine a corresponding category for each piece of music among the plurality of categories; and creating a playlist based on pieces of music corresponding to one or more categories among the plurality of categories.

In the embodiment, wherein each RTP score further corresponds to an intensity level within the corresponding category.

In the embodiment, further comprising modifying the playlist based on the intensity levels of pieces of music within the one or more categories among the plurality of categories. In the embodiment, wherein the intensity levels of the pieces of music are human-derived. In the embodiment, wherein the intensity levels of the pieces of music are based on a spectrum of the human-derived RTP scores within each category. In the embodiment, further comprising modifying the playlist based on one or more of a music genre corresponding to each piece of music among the pieces of music, a decade during which each piece of music among the pieces of music were published, and an artist that performed each piece of music among the pieces of music. In the embodiment, wherein modifying the playlist includes excluding one or more of the music genre, the decade and the artist. In the embodiment, wherein modifying the playlist includes including one or more of the music genre, the decade and the artist.

In the embodiment, further comprising providing a user interface configured to enable a user to modify the computer-derived RTP scores for one or more pieces of music, wherein the medication changes the corresponding category for at least some of the one or more pieces of music. In the embodiment, wherein providing a user interface includes providing a three-dimensional image that includes positions for objects corresponding to at least a plurality of RTP scores, and wherein a plurality of objects corresponding to the computer-derived RTP scores for one category among the plurality of categories form a three-dimensional shape within the three-dimensional image. In the embodiment, wherein providing the user interface configured to enable the user to modify the computer-derived RTP scores for the one category includes enabling the user to adjust one or more of the R range, the T range, and the P range for the three-dimensional shape. In the embodiment, wherein providing the user interface configured to enable the user to modify the computer-derived RTP scores includes enabling the user to adjust one or more of the R range, the T range, and the P range for the computer-derived RTP scores of the one category.

In the embodiment, wherein the low-level data contributing to a determination of the R score of each computer-derived RTP score include one or more of: a beats per minute histogram, energy in a frequency band, and mel-frequency cepstrum coefficients. In the embodiment, wherein the low-level data contributing to a determination of the T score of each computer-derived RTP score include one or more of: Shannon entropy, a beats per minute histogram, and mel-frequency cepstrum coefficients. In the embodiment, wherein the low-level data contributing to a determination of the T score of each computer-derived RTP score include one or more of: a weighted mean of frequencies as a measure of a spectral centroid, Shannon entropy, and a beats per minute histogram.

In the embodiment, wherein analyzing includes converting the low-level data to mel-frequency cepstrum coefficient (MFCC) data; inputting the MFCC data to a neural network trained to extract the MFCC data and to combine the MFCC data with additional data to identify one RTP score for each piece of music, wherein the neural network is trained based on known associations between MFCC data and RTP scores. In the embodiment, wherein the additional data includes audio data augmentation data.

In an embodiment, a method for categorizing music comprises creating a sample set that includes a RTP score for a plurality of possible combinations of a rhythm score (R), a texture score (T), and a pitch score (P) respectively from a R range, a T range, and a P range, at least some of which RTP scores each correspond to a human-determined RTP score for a predetermined piece of music among a plurality of predetermined pieces of music, each RTP score corresponding to a category among a plurality of categories; extracting low-level data from each piece of music among a plurality of pieces of music to be RTP scored; converting the low-level data to mel-frequency cepstrum coefficient (MFCC) data; inputting the MFCC data to a neural network trained to extract the MFCC data and identify one RTP score for each piece of music, wherein the neural network is trained based on the sample set, each identified RTP score corresponding to one RTP score in the sample set; utilizing the identified RTP scores for each piece of music to determine a corresponding category for each piece of music among the plurality of categories; and creating a playlist based on pieces of music corresponding to one or more categories among the plurality of categories. In the embodiment, wherein the neural net is further trained to combine the MFCC data with audio data augmentation data to identify the one RTP score for each piece of music.

In an embodiment, a method for categorizing music comprises creating a sample set that includes a RTP score for a plurality of possible combinations of a rhythm score (R), a texture score (T), and a pitch score (P) respectively from a R range, a T range, and a P range, wherein at least some of the RTP scores each correspond to a human-determined RTP score for a predetermined piece of music among a plurality of predetermined pieces of music, wherein each predetermined piece of music has a unique music identification code, wherein each unique music identification code corresponds to one RTP score, and wherein each RTP score corresponds to a category among a plurality of categories; identifying a music identification code associated with each piece of music among a plurality of pieces of music to be RTP scored; determining if the music identification code for each piece of music to be RTP scored matches any of the unique music identification codes corresponding to the predetermined pieces of music; when the music identification code matches one unique identification code among the unique identification codes, identifying the one RTP score as the RTP score corresponding to the matched unique music identification code; utilizing the one RTP score for each piece of music to determine a corresponding category for each piece of music among the plurality of categories; and creating a playlist based on pieces of music corresponding to one or more categories among the plurality of categories.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

While certain example or illustrative examples have been described, these examples have been presented by way of example only, and are not intended to limit the scope of the subject matter disclosed herein. Indeed, the novel methods and systems described herein may be embodied in a variety of other forms. The accompanying claims and their equivalents are intended to cover such forms or modifications as would fall within the scope and spirit of certain of the subject matter disclosed herein.

What is claimed:

1. A method for categorizing music, comprising:
creating a sample set that includes a RTP score for a plurality of possible combinations of a rhythm score (R), a texture score (T), and a pitch score (P) respectively from a R range, a T range, and a P range, at least some of which RTP scores each correspond to a human-determined RTP score for a predetermined piece of music among a plurality of predetermined pieces of music, each RTP score corresponding to a category among a plurality of categories;
extracting low-level data from each piece of music among a plurality of pieces of music to be RTP scored;
analyzing the low-level data to determine computer-derived RTP scores for each piece of music among the plurality of pieces based on the sample set, each computer-derived RTP score corresponding to one RTP score in the sample set;
utilizing the computer-derived RTP scores for each piece of music to determine a corresponding category for each piece of music among the plurality of categories; and
creating a playlist based on pieces of music corresponding to one or more categories among the plurality of categories.

2. The method of claim 1, wherein each RTP score further corresponds to an intensity level within the corresponding category.

3. The method of claim 2, further comprising modifying the playlist based on the intensity levels of pieces of music within the one or more categories among the plurality of categories.

4. The method of claim 3, wherein the intensity levels of the pieces of music are human-derived.

5. The method of claim 3, wherein the intensity levels of the pieces of music are based on a spectrum of the human-derived RTP scores within each category.

6. The method of claim 3, further comprising modifying the playlist based on one or more of a music genre corresponding to each piece of music among the pieces of music, a decade during which each piece of music among the pieces of music were published, and an artist that performed each piece of music among the pieces of music.

7. The method of claim 6, wherein modifying the playlist includes excluding one or more of the music genre, the decade and the artist.

8. The method of claim 6, wherein modifying the playlist includes including one or more of the music genre, the decade and the artist.

9. The method of claim 1, further comprising providing a user interface configured to enable a user to modify the computer-derived RTP scores for one or more pieces of music, wherein the medication changes the corresponding category for at least some of the one or more pieces of music.

10. The method of claim 9, wherein providing a user interface includes providing a three-dimensional image that includes positions for objects corresponding to at least a plurality of RTP scores, and wherein a plurality of objects corresponding to the computer-derived RTP scores for one category among the plurality of categories form a three-dimensional shape within the three-dimensional image.

11. The method of claim 10, wherein providing the user interface configured to enable the user to modify the computer-derived RTP scores for the one category includes enabling the user to adjust one or more of the R range, the T range, and the P range for the three-dimensional shape.

12. The method of claim 9, wherein providing the user interface configured to enable the user to modify the computer-derived RTP scores includes enabling the user to adjust one or more of the R range, the T range, and the P range for the computer-derived RTP scores of the one category.

13. The method of claim 1, wherein the low-level data contributing to a determination of the R score of each computer-derived RTP score include one or more of: a beats per minute histogram, energy in a frequency band, and mel-frequency cepstrum coefficients.

14. The method of claim 1, wherein the low-level data contributing to a determination of the T score of each computer-derived RTP score include one or more of: Shannon entropy, a beats per minute histogram, and mel-frequency cepstrum coefficients.

15. The method of claim 1, wherein the low-level data contributing to a determination of the T score of each computer-derived RTP score include one or more of: a weighted mean of frequencies as a measure of a spectral centroid, Shannon entropy, and a beats per minute histogram.

16. The method of claim 1, wherein analyzing includes:
converting the low-level data to mel-frequency cepstrum coefficient (MFCC) data;
inputting the MFCC data to a neural network trained to extract the MFCC data and to combine the MFCC data with additional data to identify one RTP score for each piece of music, wherein the neural network is trained based on known associations between MFCC data and RTP scores.

17. The method of claim 16, wherein the additional data includes audio data augmentation data.

18. A method for categorizing music, comprising:
creating a sample set that includes a RTP score for a plurality of possible combinations of a rhythm score (R), a texture score (T), and a pitch score (P) respectively from a R range, a T range, and a P range, at least some of which RTP scores each correspond to a human-determined RTP score for a predetermined piece of music among a plurality of predetermined pieces of music, each RTP score corresponding to a category among a plurality of categories;
extracting low-level data from each piece of music among a plurality of pieces of music to be RTP scored;
converting the low-level data to mel-frequency cepstrum coefficient (MFCC) data;
inputting the MFCC data to a neural network trained to extract the MFCC data and identify one RTP score for each piece of music, wherein the neural network is trained based on the sample set, each identified RTP score corresponding to one RTP score in the sample set;
utilizing the identified RTP scores for each piece of music to determine a corresponding category for each piece of music among the plurality of categories; and
creating a playlist based on pieces of music corresponding to one or more categories among the plurality of categories.

19. The method of claim 18, wherein the neural net is further trained to combine the MFCC data with audio data augmentation data to identify the one RTP score for each piece of music.

20. A method for categorizing music, comprising:

creating a sample set that includes a RTP score for a plurality of possible combinations of a rhythm score (R), a texture score (T), and a pitch score (P) respectively from a R range, a T range, and a P range, wherein at least some of the RTP scores each correspond to a human-determined RTP score for a predetermined piece of music among a plurality of predetermined pieces of music, wherein each predetermined piece of music has a unique music identification code, wherein each unique music identification code corresponds to one RTP score, and wherein each RTP score corresponds to a category among a plurality of categories;

identifying a music identification code associated with each piece of music among a plurality of pieces of music to be RTP scored;

determining if the music identification code for each piece of music to be RTP scored matches any of the unique music identification codes corresponding to the predetermined pieces of music;

when the music identification code matches one unique music identification code among the unique music identification codes identifying the one RTP score as the RTP score corresponding to the matched unique music identification code;

utilizing the one RTP score for each piece of music to determine a corresponding category for each piece of music among the plurality of categories; and creating a playlist based on pieces of music corresponding to one or more categories among the plurality of categories.

\* \* \* \* \*